Patented June 10, 1952

2,599,531

UNITED STATES PATENT OFFICE 2,599,531

PREPARATION OF PECTINESTERASE

Carl V. Smythe, Moorestown, N. J., Billy Blandin Drake, Philadelphia, and John Armstrong Miller, Ithan, Pa., assignors to Rohm & Haas Company, Philadelphia, Pa., a corporation of Delaware No Drawing. Application November 14, 1949, Serial No. 127,241

5 Claims. (Cl. 195—66)

This invention relates to a pectinesterase which is free from the enzyme that splits the pectin chain, here in termed polygalacturonase, and to a method whereby such pectinesterase is prepared.

Pectin acid and low-methoxyl pectin are valuable congealing agents or gelling agents, particularly when they are combined with polyvalent metals to form salts. The effectiveness of low-methoxyl pectin depends upon the degree of demethylation, the position of the retained methyl groups, and the extent of degradation.

As is known, pectin is obtained from plants by extraction and precipitation and as obtained has a methyl ester content of 10% to 14%. By the action of a pectinesterase (sometimes referred to as a pectase) methyl ester groups are hydrolyzed. The partially demethylated products derived from pectin are here termed low-methoxyl pectins, although these are sometimes termed pectinic acids. These appear more effective in some cases for forming gels than the completely demethylated product called pectic acid. Since hydrolysis with the aid of enzymes is capable of giving the intermediate acids and of yielding low-methoxyl pectins having a high gelling power, enzymes present an advantage over alkalies or acids as hydrolytic agents. Yet the esterases which have heretofore been known and which retain activity at the normal pH of pectin; namely, about pH 3.5, have been accompanied by an appreciable proportion of polygalacturonase which causes splitting of the pectin chain. There then results a substantial loss in gelling power for a given weight of pectin, low-methoxyl pectin, or pectic acid.

A method has now been discovered whereby a pectinesterase is prepared by means of which pectin is demethylated up to about 75% without breaking down the pectin molecule. It has been found that the enzyme systems which have heretofore been prepared and found to be suitable for acting upon pectin at its normal pH contain both polygalacturonase and pectinesterase. There has not been known until now any practical method for destroying one of such enzymes without extensively deactivating the other in the mixture.

Pectinesterase free from polygalacturonase or so low in the latter that it has no untoward effect on the gelling power of the demethylated product is prepared by making a solution of a polygalacturonase-pectinesterase enzyme system and of urea or thiourea and allowing the solution containing said enzyme system and the urea to stand until the activity of the polygalacturonase is no longer evident. The pectinesterase may then be isolated.

As source of the pectic enzyme preparations, enzyme systems may be prepared from the growth of organisms on nutrient media. Various bacteria are known to produce ferments acting on pectin. A preferred source is from mold fungi grown on such media as cereals including wheat or rice bran, wheat middlings, soya bean meal, and the like, particularly when these are supplemented by the addition of pectin. Suitable for the production of pectic ferments on these materials are various members of the Aspergillus group such as *Aspergillus niger*, *Aspergillus flavus*, *Aspergillus oryzae*, *Aspergillus fumigatus*, *Aspergillus parasitans*, *Aspergillus tamari*, *Aspergillus wentii*, and also such organisms as *Rhizopus tritici*, *Rhizopus nigricans*, *Penicillium glaucum*, etc.

Extracts may be made from the culture and treated directly with urea. Alternatively, the extract may be combined with a water-miscible, volatile, organic solvent such as methanol, ethanol, isopropanol, or acetone, and the enzymes precipitated and separated. The enzymes thus isolated comprise a mixture of polygalacturonase and pectinesterase and are redissolved in water for treatment with urea or thiourea or a mixture thereof.

The destruction or deactivation of the polygalacturonase is accomplished by treating the mixture of polygalacturonase and pectinesterase with an aqueous urea solution which is highly concentrated. It is preferred that the molality of the solution of urea be about 6 to 6.6 moles per liter. Practically saturated solutions of thiourea are preferred.

The time required for treatment with urea varies from about two minutes to 48 hours. The exact time will depend upon the particular enzyme system being treated, its concentration, the pH of the treating solution, and the temperature thereof. With increasing temperature, as might be expected, the time required for treating is lessened. Thus, while times of six to eight hours are satisfactory at 35° C., the polygalacturonase activity disappears in two to five minutes at 60° C. and the period of treatment should not be prolonged at such a high temperature since some pectinesterase will be lost under these conditions. Temperatures down to about 5° C. may be used with compensating extension of time up to 48 hours. In any case the solution of enzymes and urea is allowed to stand until the activity of the polygalacturonase has substantially disappeared. Preferred conditions of standing are between 30° C. and 45° C. for a period from eight hours to one hour.

With thiourea preferred temperatures are somewhat less than with urea, a range of 5° C. to 30° C. being effective for destroying the polygalacturonase appreciably more rapidly than the pectinesterase. Thus, when a solution of polygalacturonase and pectinesterase was approximately saturated with thiourea, the activity of the polygalacturonase was reduced to 0.1% of its original activity in 26 hours at both 15° C. and 25° C. While some of the activity of the pectinesterase was lost, the solutions still showed considerable activity therefrom.

The pH of the treating solutions is desirably held between 6 and 8 and is best when on the acid side of neutrality, for there is then the least loss of pectinesterase.

The pH at which treating with a urea may be accomplished is not, however, confined to 6 to 8. Particularly with enzyme systems developed by growing fungi on nutrient media the range of pH may be much lower since these pectinesterases are stable even at a pH as low as 1.5. The treatment has also been successful at a pH above 9. The range of 1.5 to 9.5 may thus be used, even though the most effective pH for the actual utilization of the pectinesterase is slightly on the acid side. Because the enzymes of fungal origin are effectively used at a pH below 4, they form a preferred class of materials. The importance of their stability and utility at low pH's lies in the fact that the natural pH of pectin and of fruit juice is below 4.

In the treatment of enzyme systems with urea, it is convenient to work with relatively concentrated solutions of enzymes. Thus, extracts containing 10% to 40% of solids are suitable and urea may be dissolved therein at concentrations of about 500 grams or more per liter of such extract. Where the enzymes have been thrown down through solvent precipitation, there may be made up solutions containing 5% to 40% of the solvent-precipitated product. If the precipitate is not completely water-soluble, the solution may be filtered before treatment with urea.

After the urea-enzyme solution has stood for a suitable time, it may be examined for polygalacturonase activity and, when this has substantially decreased, the solution is worked up. The pectinesterase is recovered from solution by addition of a water-miscible, volatile, organic solvent. Ethanol is the solvent of first choice. The precipitation is best accomplished in the cold, temperatures of 5° C. to 20° C. being particularly suitable.

The amount of solvent added may be varied from about three to ten volumes per volume of treated enzyme solution. The precipitate may be separated and washed by decanting and filtering. It may be separated by centrifuging from solution. The separated precipitate is dried at room temperature up to about 50° C. or more without loss of activity.

Illustrative examples of the preparation of pectinesterase essentially free of the enzyme splitting the pectin chain follow.

Example 1

A nutrient medium was prepared by mixing 1500 parts by weight of bran, 1200 parts of apple pomace, 100 parts of diammonium phosphate, and 2600 parts of water. The mixture was heated in an autoclave to sterilize it and then inoculated with a suspension of spores of a selected strain of *Aspergillus niger* in 1000 parts of water. The culture was incubated at 25° C. to 35° C. for 48 hours and then dried at about 50° C. It was then extracted with water and four fractions were collected, having densities of 16.8° Brix, 15.8° Brix, 9.6° Brix, and 4.5 Brix respectively. The first two contained 88% of the enzyme activity.

These extracts were then treated with urea, 500 grams thereof being added for each liter of extract. The pH of the solution was adjusted to 6.7 by the addition of 12 parts of ammonia water per liter of solution. The solution was then warmed to 35° C. and maintained at this temperature for six hours, during which time it was stirred from time to time.

The solution was then chilled to 15° C. and adjusted to a pH of 5.5 with acetic acid, 10 grams of glacial acetic acid being required per liter to accomplish this purpose. Five volumes of ethanol were then added per volume of the solution. A precipitate was formed which soon settled. The supernatant liquor was taken off by decantation and the precipitate suspended in three volumes of cold alcohol. The precipitate was separated by centrifuging and dried in a thin layer at 40° C. There was obtained 53 grams of product per liter of extract treated.

This product was found to be effective in demethylating pectin, yielding low-methoxyl pectins which had high gelling power. Conversion of those low-methoxyl pectins to calcium salts by treatment with soluble calcium salts gave jellies at low concentrations without the use of the amounts of sugar which are ordinarily required to yield relatively rigid gels. Furthermore, the calcium salts obtained are useful for filming foods.

Example 2

A nutrient medium as above was inoculated with a selected strain of *Penicillium glaucum* spores and incubated at 35° C.–40° C. for 36 hours. The extract therefrom had a density of 18° Brix. To a portion of 1500 ml. of this extract was added 750 grams of urea and the mixture stirred until the urea was all dissolved. The pH of the solution was 5.5. It was adjusted to 6.5 by the addition of 25 ml. of 28% ammonia. The total volume was then 2090 ml. The solution was held at 40° C. for 90 minutes with frequent stirring. The mixture was chilled to 15° C. and treated with 11 grams of glacial acetic acid to adjust the pH to 5.5. To this solution were added 10.5 liters of cold ethyl alcohol. After the mixture had been thoroughly stirred, it was allowed to stand in the cold. The clear supernatant liquor was drawn off and the precipitate washed with four liters of ethyl alcohol. The precipitate was again allowed to settle, the clear liquor drawn off and the precipitate collected on a filter. The precipitate was dried at 50° C. for three hours. The yield was 112 grams of product rich in pectinesterase but free of 99.98% of the original polygalacturonase content.

Example 3

A nutrient mixture was inoculated with a strain of *Aspergillus oryzae* known to produce polygalacturonase-pectinesterase in good yields and was incubated by methods such as set forth above. The extract from the culture was treated with alcohol, and the enzymes precipitated and then separated. The product thus obtained was a concentrate of both polygalacturonase and pectinesterase.

A portion of one hundred grams of this dried product was dissolved in water. This solution was adjusted to a volume of one liter and treated with 500 grams of urea which was dissolved with agitation. The pH of the solution was 6.15. It was adjusted to 6.5 by the addition of 4 ml. of 28% ammonia water. The total volume was now 1330 ml. The solution was brought to 35° C. and held at this temperature for 90 minutes. It was then chilled to 10° C.–15° C. and adjusted to a pH of 5.5 with glacial acetic and mixed with 6650 ml. of cold ethyl alcohol. The precipitate which formed was allowed to settle and the supernatant liquor taken off. The precipitate was agitated with 2200 ml. of cold ethyl alcohol and again allowed to settle. The precipitate was separated by centrifuging and dried at 50° C. The yield was 71.3 grams of a product rich in pectinesterase and almost entirely free of polygalacturonase.

*Example 4*

There were taken 2000 ml. of an extract containing 13.5% of solids, which was obtained by treating a culture medium on which *Aspergillus flavus-oryzae* had been grown as in the above examples. There was added 1000 grams of urea and the mixture stirred until the urea was dissolved. The pH was adjusted to 6.75 with ammonia water while the solution was held at 15° C. It was then heated to 35° C. and maintained at this temperature for eight hours with continuous stirring. The solution was then chilled to 15° C. and adjusted to a pH of 6 with acetic acid. The solution was then stored at 0° C. overnight. The volume at this point was 2680 ml.

After the solution had been thoroughly stirred, and while stirring was continued, there were added ten liters of cold ethyl alcohol. The precipitate which formed was permitted to settle. The supernatant liquor was drawn off and two liters of cold alcohol added to the settled precipitate. The precipitate was again allowed to settle, the supernatant liquor drawn off, and the washing step repeated. The precipitate was finally collected in a centrifuge and dried in a desiccator. The product weighed 120 grams. It was a highly active pectinesterase and exhibited no noticeable activity in respect to polygalacturonase.

*Example 5*

An extract from a culture of a selected strain of *Aspergillus oryzae* was treated with alcohol and a precipitate of enzymes was obtained. The precipitate contained both polygalacturonase and pectinesterase. About 50 grams of this product was dissolved in a half-liter of water. Thiourea was added thereto until the solution was almost saturated. The solution was held at about 25° C. for 24 hours, at which time it was found that the polygalacturonase activity was only 0.1% of the original activity. The solution was chilled to 5° C.–10° C., brought to a pH of 5 with acetic acid, and treated with cold ethyl alcohol. A precipitate formed and was separated. It was rich in pectinesterase and almost free of polygalacturonases.

When 0.02 gram of any of the above preparations of pectinesterase is added to a solution at pH 3.5 of 2 grams of pectin and 0.7 gram of calcium acetate in 100 ml. of water and the mixture is heated at 40° C. for 60 to 90 minutes, a rigid gel is formed when the mixture is cooled.

The pectinesterases prepared as in the above examples are useful for demethylating pectin up to about 75%. When a desired extent of hydrolysis has been obtained, the pectinesterase can be deactivated by raising the temperature to about 75° C. or more. The partially methoxylated pectin may be left in solution. Such a solution may be used to form gels of fruit juices. The addition of calcium ions to such solutions assists in producing rigid gels. In addition, a low-methoxyl pectin may be precipitated from solution after action of a pectinesterase by treating a solution thereof with a water-miscible solvent such as ethanol.

When a solution of pectin is acted upon by the pectinesterase of this invention, the pectin is demethylated without appreciable change in the viscosity of the solution. This provides a test for distinguishing the product of this invention from previously known enzyme systems acting on pectin. This test, considered in conjunction with the fact that the pectinesterase produced is effective at a pH of 3.5 and lower, provides positive identification of the enzyme here-disclosed, and distinguishes it from previously known enzymes.

A typical illustration of the action of the enzyme of this invention follows. A solution of 1.55 grams of pectin in 50 ml. of water was prepared and treated with 370 mg. of the pectinesterase of this invention. It was maintained at 40° C. and from time to time acidity and viscosity were determined. At the end of one hour it was found that 30% of the ester groups had been demethoxylated. The viscosity, determined in a viscometer as 114 secs., was found unchanged from that of the original solution. After six hours it was found that 54% demethoxylation had taken place. The viscosity was then 113 secs., again essentially unchanged.

A pectin solution as above-treated with fungal enzymes which have not been treated according to this invention changed rather rapidly in viscosity as the pectin chain is split. For example, a solution of 1.55 grams of pectin in 50 ml. of water was treated with 10 mg. of the pectinesterase-polygalacturonase mixture. In 15 minutes at 40° C. the solution decreased in viscosity to 27 secs. This corresponds to a considerable loss of gelling power for a given weight of pectin. This loss is avoided when pectinesterase is prepared essentially free of polygalacturonase.

We claim:

1. A process for preparing pectinesterase substantially free from polygalacturonase which comprises treating at a pH between 1.5 and 9.5 an aqueous solution of an enzyme system containing both polygalacturonase and pectinesterase with a member of the class consisting of urea and thiourea at a high concentration in said solution, the temperature of treating being between 5° and 60° C. when urea is used and between 5° and 30° C. when thiourea is used.

2. A process for preparing pectinesterase substantially free from polygalacturonase which comprises forming an aqueous solution having a pH between 1.5 and 9.5 and containing 6 to 6.6 moles per liter of urea and an enzyme system of polygalacturonase and pectinesterase, permitting said solution to stand at 5° C. to 60° C. until activity of polygalacturonase has substantially disappeared, and separating pectinesterase from said solution.

3. A process for preparing pectinesterase substantially free from polygalacturonase which comprises forming an aqueous solution at a pH between 6 and 8 of an enzyme system containing polygalacturonase and pectinesterase, adding thereto about 500 grams of urea per liter of said solution, allowing the resulting solution to stand at 5° C. to 60° C. until polygalacturonase activity has substantially disappeared, and separating pectinesterase from the solution.

4. A process for preparing pectinesterase substantially free from polygalacturonase which comprises forming an aqueous solution at a pH between 1.5 and 7 which contains polygalacturonase and pectinesterase and 6 to 6.6 moles per liter of urea, allowing this solution to stand at 30° C. to 45° C. for a time from eight hours to one hour, and separating pectinesterase from the solution.

5. The process of claim 4 in which the enzymes are of fungal origin.

CARL V. SMYTHE.
BILLY BLANDIN DRAKE.
JOHN ARMSTRONG MILLER.

REFERENCES CITED

The following references are of record in the file of this patent:

UNITED STATES PATENTS

| Number | Name | Date |
|---|---|---|
| 1,892,247 | Neugebauer | Dec. 27, 1932 |
| 2,163,200 | Heimann | June 20, 1939 |
| 2,434,874 | Tucker | Jan. 20, 1948 |
| 2,457,560 | Jansen | Dec. 23, 1948 |
| 2,458,171 | Jansen | Jan. 4, 1949 |
| 2,479,751 | Lineweaver | Aug. 23, 1949 |